United States Patent [19]

Kapstad

[11] 4,010,517
[45] Mar. 8, 1977

[54] SHEET SUPPORT APPARATUS

[76] Inventor: Odd B. Kapstad, 5 Minot Ave., Acton, Mass. 01720

[22] Filed: Sept. 12, 1974

[21] Appl. No.: 505,420

[52] U.S. Cl. .............. 24/67.11; 24/81 PC; 211/45; 211/89
[51] Int. Cl.² .......................................... B42F 1/00
[58] Field of Search ........ 24/81 FC, 81 FT, 73 FT, 24/243 P, 255 AS, 255 FC, 255 S, 255 P, 259 PN, 259 FC, 259 PF, 259 TF, 67.9, 67.11, 67.3, 67 R, 81 PC; 211/45, 89

[56] References Cited

UNITED STATES PATENTS

| 773,392 | 10/1904 | Holsapple | 24/67.11 |
| 913,876 | 3/1909 | Cohen | 24/67.9 |
| 3,168,954 | 2/1965 | Herrmann | 211/89 |
| 3,624,873 | 12/1971 | Frey | 24/259 FC |

FOREIGN PATENTS OR APPLICATIONS

| 1,191,942 | 4/1965 | Germany | 24/67.11 |
| 321,456 | 5/1957 | Switzerland | 211/45 |

Primary Examiner—Robert L. Wolfe
Assistant Examiner—Kenneth J. Dorner
Attorney, Agent, or Firm—David E. Brook

[57] ABSTRACT

Sheet support apparatus suitable for mounting sheet material is disclosed. The apparatus is especially useful for displaying information contained on paper or cardboard, or in brochures, etc.

The apparatus comprises an elongated, rigid frame including three generally planar and integrally connected wall members spaced to define a cavity therebetween for receiving an edge of sheet material. Anchoring means, such as a leaf spring, are provided which can be inserted and removed from the cavity; the leaf spring cooperates with a shoulder on one wall member to anchor the sheet in the cavity.

9 Claims, 4 Drawing Figures

SHEET SUPPORT APPARATUS

BACKGROUND OF THE INVENTION

1. Field of the Invention

This invention is in the field of sheet support apparatus, and more particularly in the field of such apparatus for mounting sheet materials to be displayed.

2. Description of the Prior Art

Many types of mounting an apparatus for displaying sheet material have been devised. One type that is known is a rigid frame formed from wall members integrally connected and formed to provide a cavity into which a spring can be inserted. Sheet material such as paper or cardboard are inserted into the cavity and are anchored therein by the spring.

It has heretofore been typical with such frame members to position the wall members in such a way as to only provide a very small opening at the point where sheet material is inserted into the cavity. This was done to retain the spring element within the cavity where it was so placed under compression.

While such supports do serve the main purpose, they have several inherent drawbacks. Since one wall member has to be forced into close relationship to another, the typical entrusion manufacturing process is encumbered by the addition of a cold rolling step. This is necessary since the frame cannot be directly exturded with wall members having the required angle where they join. Besides being time consuming and expensive, the cold rolling step also creates a point of weakness where the wall member which is positioned by cord rolling joins to the other wall member. Additionally, since the opening in the frame leading to this cavity is very small, it has been heretofore required that the spring anchoring means be inserted only from the end of the frame and not from the side or cavity opening. This was a particular problem where the frame extended for more than very short distances.

SUMMARY OF THE INVENTION

In one embodiment, the invention comprises a new sheet support apparatus for mounting sheet material for the purpose of display. This apparatus has an elongated, rigid frame including two generally planar wall members spaced to define a cavity therebetween. In addition, a third generally planar wall member can be used to integrally join the first and second wall members. The leading edge of sheet material to be displayed is inserted into the cavity where it is engaged and anchored by a resilient member such as a leaf spring. Means for retaining the resilient anchoring means can be provided, and one such suitable means comprises a shoulder extending longitudinally along an inner surface of the first wall member.

The first wall member is positioned substantially perpendicular to the third wall member, whereas the second wall member is positioned at an angle of between about 50° and 80° with the third wall member.

The unique design of the support apparatus results in a durable, lightweight, aesthetically attractive display mount which, nevertheless, can be easily manufactured. It can, for example, be extruded from aluminum stock in which case the cold rolling step previously necessary with prior art frames to force one wall member into close proximity with another can be eliminated. Thus, not only is a previously required manufacturing step eliminated, but the creation of a weak spot created by cold rolling is eliminated. Additionally, the display is convenient to use since the leaf spring can be inserted through the side of the frame since it has a relatively large opening.

DESCRIPTION OF PREFERRED EMBODIMENTS

Figure 1:
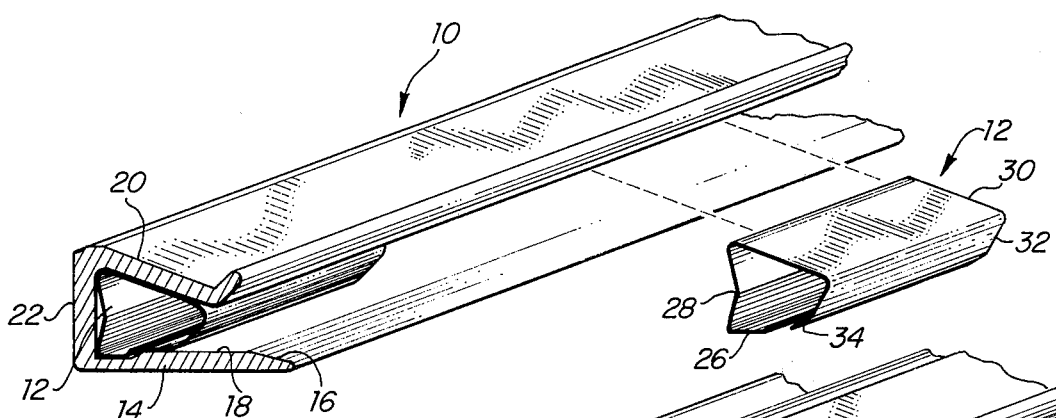
FIG. 1 illustrates schematically a sheet support apparatus having a single sheet cavity with an anchoring leaf spring insertable therein.

In FIG. 1, a sheet support apparatus is shown formed from frame 10 and leaf spring 12 which is designed to be insertable into frame 10 for the purpose of anchoring sheet material inserted therein. Frame 10 can be fabricated from metals, plastics, or other rigid materials, and is preferably formed from extruded aluminum.

Frame 10 contains three generally planar wall members integrally connected to each other. First wall member 14 provides a measure of support for an edge of sheet material inserted into frame 10. The front edge 16 of first wall member 14 can be bevelled or slanted downardly to facilitate insertion of sheet material. A shoulder 18 extends longitudinally along the inner surface of first wall member 14 from near the front edge thereof towards the rear; a slot results near the rear of first wall member 14.

Second wall member 20 extends outwardly from third wall member 22 on the same side as first wall member 14. Thus, a cavity is formed by the three wall members comprising frame 10 through which sheet material can be inserted.

Second wall member 20 forms an inside angle with third wall member 22 of between about 50° and about 80°. If the angle is more than about 80°, it has been found that sufficient containment of spring 12 is not achieved because the opening at the front of frame 10 is too large. Conversely, if the inside angle is less than about 50°, the frame 10 cannot be readily extruded from aluminum, but undergoes a cold rolling step to force second wall member 20 into close proximity to first wall member 14 after extrusion. Additionally, the opening at the front of frame 10 becomes so small that spring 12 cannot readily be inserted except from the end of frame 10, which is a particular inconvenience for frames which are not very short.

Second wall member 20 can also be provided with a front edge 24 which can be bevelled or angled upwardly which also facilitates in the insertion and removal of sheet material.

Anchoring leaf spring 12 can be formed from spring steel or other similar materials. As shown, spring 12 has a generally cantilevered beam design. A short, anchoring edge 26 is provided to fit into and to cooperate with the slot formed at the rear of the inner surface of first wall member 14 by shoulder 18 to anchor spring 12 within frame 10. Additionally, shoulder 18 allows anchoring edge 26 of spring 12 to lie lower than or in the same plane sheet material inserted into frame 10 thereby insuring that anchoring edge 26 does not interfere with or block the insertion of sheet material into frame 10. Anchoring edge 26 can be formed at an inside angle of greater than 90° from side 28 of spring 12, but, upon insertion into frame 10 spring 12 is sufficiently compressed to make this angle less than 90° which helps in achieving the proper distribution of forces on spring 12 when it is anchored in frame 10. Side 28 of leaf spring 12 is creased to bend inwardly slightly to make it adaptable to extruded frames with different inside dimensions. Side 30 of spring 12 extends away fron side 28 and is designed to lie in a substantially parallel relationship with the inside of second wall member 20 of frame 10 when spring 12 is compressed and inserted into frame 10. Side 32 of spring 12 is bent back toward anchoring edge 26 and may even have an angled edge 34 inclined at even a steeper angle to side 30.

Figure 2:
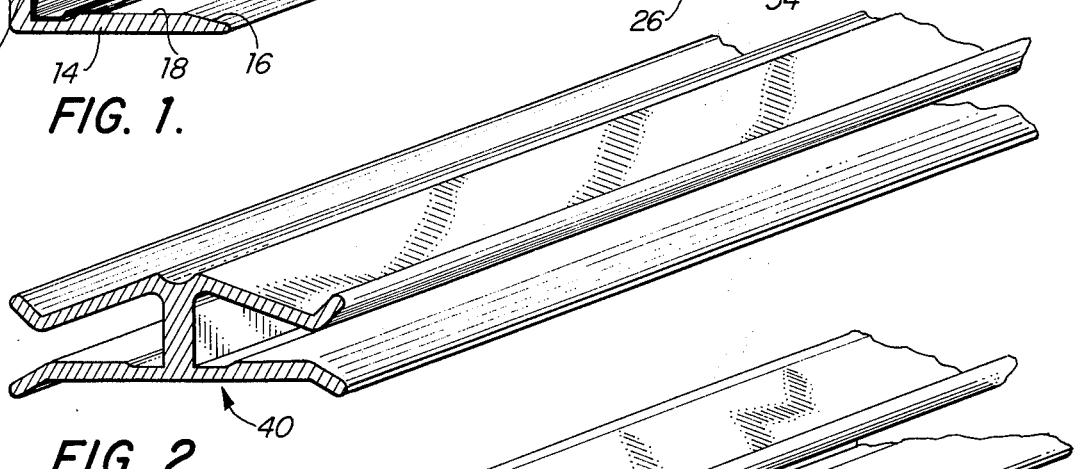
FIG. 2 illustrates schematically a sheet support apparatus having two sheet cavities.

In FIG. 2, a frame 40 is shown which has a double cavity suitable for holding two different sheet materials. Frame 40 can also be formed from extruded aluminum.

Figure 3:
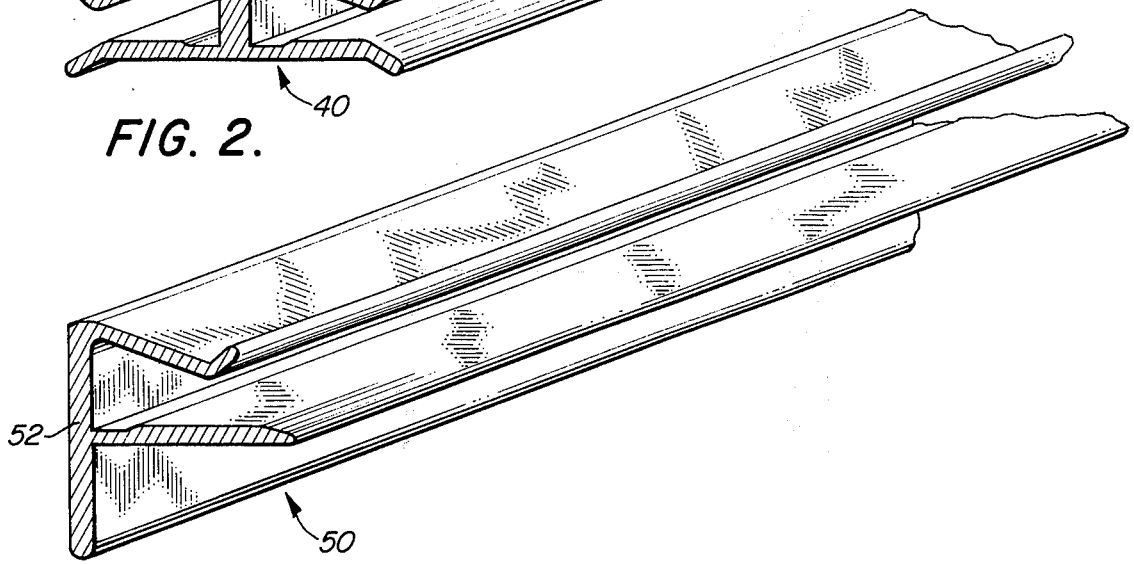
FIG. 3 illustrates schematically a sheet support apparatus having one sheet cavity and an extended joining wall member.

In FIG. 3, a different embodiment of a single cavity frame member is shown. Frame 50 has first and second wall members which are integrally connected by wall member 52 which extends beyond the first wall member providing a larger surface for affixing frame 50 to a wall or other support.

Figure 4:
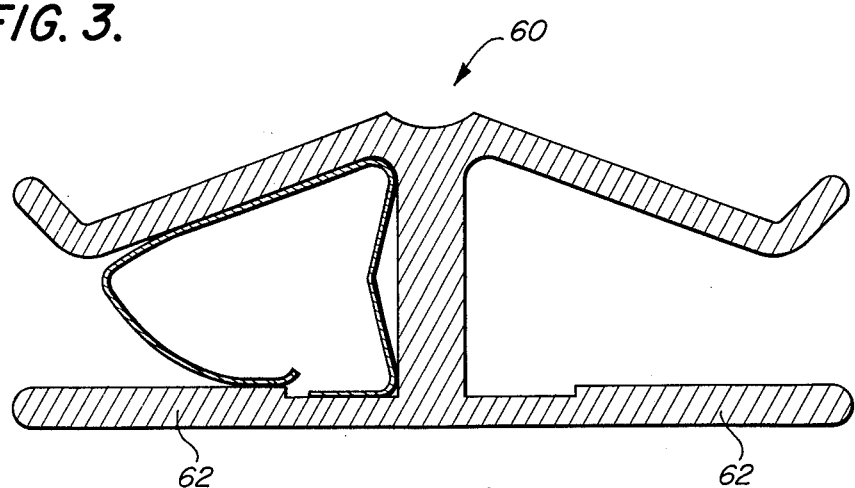
FIG. 4 illustrates a cross sectional view of a sheet support apparatus having two sheet cavities with an anchoring leaf spring in one of the cavities.

FIG. 4 shows a cross sectional view of a frame 60 which has two cavities and has first wall members 62 which are formed in a substantially horizontal maner without the angled front leading edge previously described. It can thus be attached to a wall, for example, very easily since it lies in a flat plane.

It will be understood that various other changes in the details, materials, steps, and arrangements of parts which have been described and illustrated in order to explain the nature of the invention will occur to and may be made by those skilled in the art upon a reading of this disclosure and such changes are intended to be included within the principle and scope of this invention which is limited only by the claims attached hereto.

What is claimed is:
1. Sheet support apparatus, comprising:
    a. an elongated, rigid frame, said frame including first, second and third wall members, said wall members having generally planar inner and outer wall surfaces, and said wall members being integrally connected and spaced to define an elongated cavity therebetween for receiving an edge of a sheet to be supported, said first wall member being substantially perpendicular to said third wall member and said second wall member meeting said third wall member at an angle of between about 50° and about 80°;
    b. resilient anchoring means for anchoring a sheet edge within said cavity, said resilient anchoring means comprising a leaf spring having first and second terminal portions, said first terminal portion slanted towards said third wall member thereby making it easier to insert a sheet edge into its anchored position within said frame cavity than to withdraw it therefrom, said leaf spring also having one of its sides in substantially continuous contact with the inside surface of said second wall member and having another of its sides bent inwardly away from the inner surface of said third wall member; and,
    c. means for retaining said resilient anchoring means within said cavity, said means for retaining comprising an indented slot forming a shoulder located on the inner surface of said first wall member contiguous to where said first wall member joins said third wall member, said shoulder extending longitudinally along said first wall member, and said second terminal portion of said leaf spring designed to cooperate with said shoulder to retain the leaf spring within the frame cavity.

2. Sheet support apparatus of claim 1 wherein said first wall member has a leading edge slanted away from said frame cavity for facilitating insertion and removal of a sheet edge.

3. Sheet support apparatus of claim 2 wherein said second wall member has a leading edge slanted away from said cavity for facilitating insertion and removal of a sheet edge.

4. Sheet support apparatus of claim 1 also including a second elongated rigid frame having two generally planar wall members defining a cavity therebetween, said wall members being integrally connected to said third wall member.

5. Sheet support apparatus of claim 1 wherein said third wall member extends beyond said first wall member.

6. Sheet support apparatus of claim 1 formed from extruded aluminum.

7. Sheet support apparatus of claim 3 formed from extruded aluminum.

8. Sheet support apparatus of claim 4 formed from extruded aluminum.

9. Sheet support apparatus of claim 5 formed from extruded aluminum.

* * * * *